United States Patent
Jang et al.

(10) Patent No.: US 7,266,309 B2
(45) Date of Patent: Sep. 4, 2007

(54) APPARATUS AND METHOD FOR STABILIZING BIAS VOLTAGE FOR PULSE GENERATING MODULATOR

(75) Inventors: Youn Seon Jang, Daejeon (KR); Kwang Joon Kim, Daejeon (KR); Jin Soo Han, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 552 days.

(21) Appl. No.: 10/826,015

(22) Filed: Apr. 16, 2004

(65) Prior Publication Data

US 2005/0128556 A1   Jun. 16, 2005

(30) Foreign Application Priority Data

Dec. 15, 2003   (KR) .................. 10-2003-0091596

(51) Int. Cl.
*H04B 10/04* (2006.01)
*H04B 10/12* (2006.01)

(52) U.S. Cl. .............. 398/198; 398/182; 398/195; 398/197; 385/2; 385/3

(58) Field of Classification Search .......... 359/239; 398/195, 198
See application file for complete search history.

(56) References Cited

U.S. PATENT DOCUMENTS

| | | | |
|---|---|---|---|
| 5,003,624 A | 3/1991 | Terbrack et al. | |
| 5,074,631 A * | 12/1991 | Hamano et al. | 385/3 |
| 5,629,792 A | 5/1997 | Masaki | |
| 6,317,247 B1 * | 11/2001 | Yang et al. | 359/245 |
| 6,362,913 B2 * | 3/2002 | Ooi et al. | 359/245 |
| 6,473,219 B1 * | 10/2002 | King | 359/245 |
| 6,510,255 B2 * | 1/2003 | Masuda et al. | 385/2 |
| 6,580,544 B1 | 6/2003 | Lin et al. | |
| 6,778,310 B2 * | 8/2004 | Puleo | 359/264 |
| 7,092,643 B2 * | 8/2006 | Kajiya et al. | 398/198 |
| 2005/0249444 A1 * | 11/2005 | Imai et al. | 385/1 |

FOREIGN PATENT DOCUMENTS

KR   100247482   12/1999

OTHER PUBLICATIONS

"Alternative Modulation Formats in Nx40 Gb/s WDM Standard Fiber RZ-Transmission System", A. Hodzic, et al., Journal of Lightwave Technology, vol. 20, No. 4, Apr. 2002, pp. 598-607.

"Novel Automatic Bias Voltage Control For Travelling-Wave Electrode Optical Modulators", Electronics Letters, May 23, 1991, vol. 27, No. 11 pp. 943-945.

* cited by examiner

*Primary Examiner*—Kenneth Vanderpuye
*Assistant Examiner*—Luis Garcia
(74) *Attorney, Agent, or Firm*—Blakely Sokoloff Taylor & Zafman (57) ABSTRACT

The present invention relates to an apparatus and method for stabilizing a bias voltage for a pulse generating modulator, which can automatically detect an optimal bias voltage for an external modulator, which is used in RZ or CSRZ modulation of an optical transmission signal using NRZ data to generate a reference pulse optical signal, and maintain the optimal bias voltage. In the bias voltage stabilizing method of the present invention, an output signal of the external modulator, to which the bias voltage to be stabilized is applied, is detected, a drive clock signal applied to the external modulator is detected, a mean output value of the products obtained by the multiplication of the output signal and the clock signal is periodically examined, and the bias voltage is adjusted so that the mean output value becomes "0".

7 Claims, 8 Drawing Sheets

APPARATUS AND METHOD FOR STABILIZING BIAS VOLTAGE FOR PULSE GENERATING MODULATOR

BACKGROUND OF THE INVENTION

1. Field of the Invention

The present invention relates, in general, to a return-to-zero modulator using non-return-to-zero data or a carrier suppressed return-to-zero modulator and, more particularly, to an apparatus and method for stabilizing a bias voltage for an external pulse generating modulator, which performs automatic control to automatically detect an optimal bias voltage for the external pulse generating modulator provided in the return-to-zero modulator or carrier suppressed return-to-zero modulator and to maintain the optimal bias voltage during the operation of the modulator.

2. Description of the Related Art

In a long distance optical transmission system using Wavelength Division Multiplexing (WDM), the modulation of a transmission signal has been performed by a Non-Return-to-Zero (NRZ) modulation method using a Mach-Zehnder type external modulator. The external modulator used in this case exhibits a phenomenon (Direct Current (DC) bias drift) in which a transfer curve moves laterally due to the variation of a temperature, etc. An optical transmission signal is distorted due to the DC bias drift caused by the temperature variation, so that an extinction ratio is deteriorated and unstable power is output, thus deteriorating the performance of the system. Therefore, the technology of automatically correcting a bias voltage is required so as to output a stable signal regardless of the temperature variation. Currently, various methods and apparatuses for correcting bias voltages for modulators based on NRZ modulation have been proposed.

However, recently, as a transmission rate of an optical transmission network increases and an interval between channels narrows, various modulation methods based on Return-to-Zero (RZ) modulation instead of conventional NRZ modulation have been researched to perform the modulation of a transmission signal.

Figure 1:
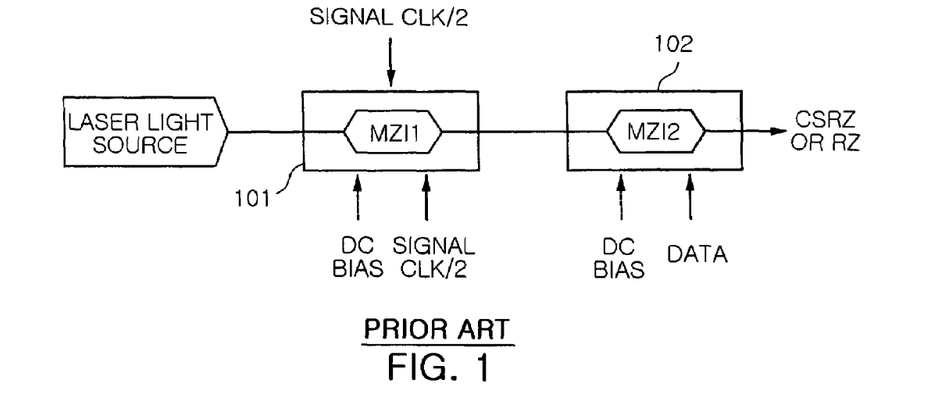
FIG. 1 is a view showing the construction of a RZ or CSRZ modulator using NRZ data.

A Return-to-Zero modulator (hereinafter referred to as an "RZ modulator") using NRZ data shown in FIG. 1 is one of modulators based on RZ modulation, which has been newly researched.

Referring to FIG. 1, the RZ modulator using NRZ data includes a Mach-Zehnder type first external modulator (Mach-Zehnder Interferometer 1: MZI1) 101 for receiving a laser beam from a laser light source to generate pulses, and a second external modulator (Mach-Zehnder Interferometer 2: MZI2) 102 for modulating the pulses output from the first external modulator 101 using a NRZ modulation method.

Figure 2:
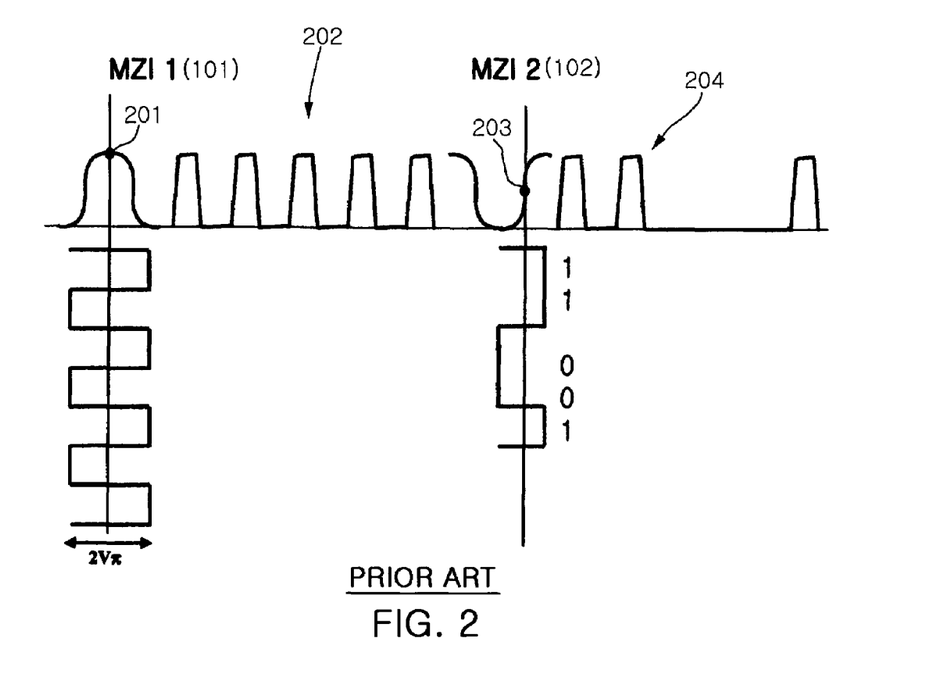
FIG. 2 is a view showing the operating principles of the RZ modulator using NRZ data.

A bias voltage for the first external modulator 101 is located at the peak point of its transfer curve as indicated by reference numeral 201 in a graph of FIG. 2, so that the laser beam is modulated at a voltage amplitude of 2Vπ in synchronization with signal clock/2. As a result of the modulation, the laser beam is converted into a pulse signal indicated by reference numeral 202 of FIG. 2.

The pulse signal 202 is applied to the second external modulator 102. A bias voltage for the second external modulator 102 is located at the point indicated by reference numeral 203 of FIG. 2, that is, the mid-point of the slope of its transfer curve, so that the second external modulator 102 performs an ON/OFF function of gating a signal on and off in response to a data signal, that is, a NRZ modulating function. As a result of the NRZ modulation, a pulse signal carrying data is generated as indicated by reference numeral 204.

Figure 3:
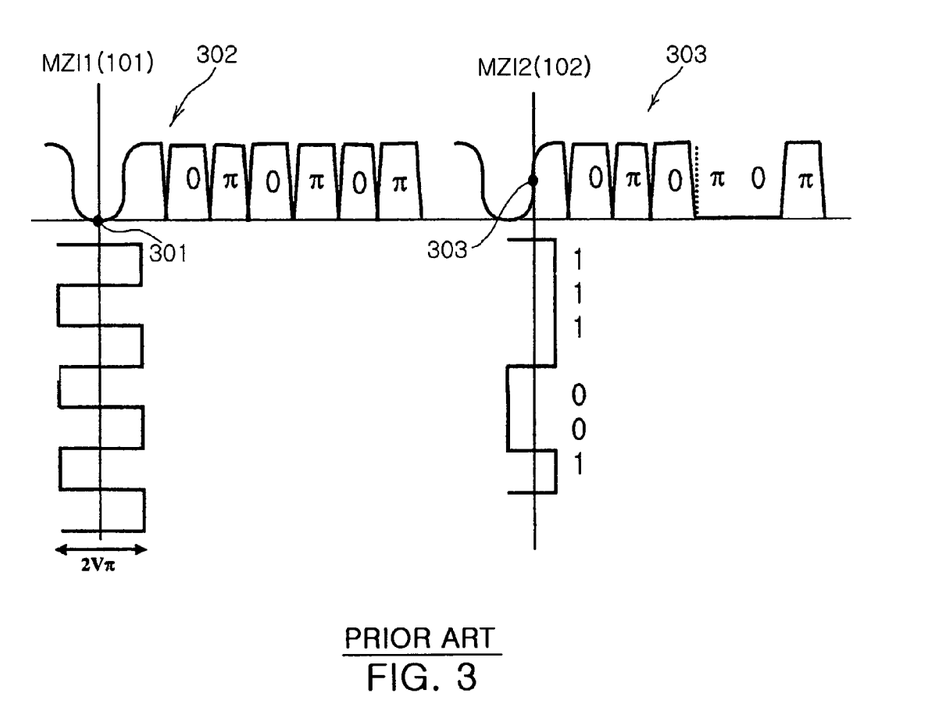
FIG. 3 is a view showing the operating principles of the CSRZ modulator.

For another modulator based on RZ modulation besides the above modulator, there is a Carrier Suppressed Return-to-Zero modulator (hereinafter referred to as a "CSRZ modulator"), which has a construction similar to that of FIG. 1. However, as shown in FIG. 3, there is a difference between the RZ modulator and the CSRZ modulator in that the bias voltage for the first external modulator 101 is located at the bottom point 301 of its transfer curve. Therefore, the laser beam is modulated at a voltage amplitude of 2Vπ in synchronization with signal clock/2. As a result of the modulation, a pulse signal as indicated by reference numeral 302 is generated and a phase difference of 180 degrees exists between neighboring pulses. At this time, referring to the spectrum of the pulse signal 302, a carrier is suppressed and is not shown.

The pulse signal 302 is input to the second external modulator 102, and then modulated into a pulse signal 303 carrying data using NRZ modulation by the second external modulator 102.

In the modulator of FIG. 1 operated as described above, there is no problem even though the second external modulator 102 employs a conventional bias control scheme without change; however, the first external modulator 101 cannot employ a bias voltage stabilizing method, which was used in the conventional NRZ modulation, without change in accordance with the operating characteristics thereof. Therefore, new bias stabilizing technology is required.

SUMMARY OF THE INVENTION

Accordingly, the present invention has been made keeping in mind the above problems occurring in the prior art, and an object of the present invention is to provide an apparatus and method for stabilizing a bias voltage for an external pulse generating modulator, which can automatically detect an optimal bias voltage for the external modulator, which is used in RZ or CSRZ modulation of an optical transmission signal using NRZ data to generate a reference pulse optical signal, and maintain the optimal bias voltage.

In order to accomplish the above object, the present invention provides an apparatus for stabilizing a bias voltage for an external modulator used for pulse generation, comprising optical dividing means for allowing an optical signal output from the external modulator, to which the bias voltage is to be applied, to branch off; optical/electrical converting means for converting the output optical signal branched by the optical dividing means into an electrical signal; multiplying means for multiplying the optical signal, output from the external modulator and applied through the optical/electrical converting means, by a drive clock signal applied to the external modulator; mean output measuring means for measuring a mean output value of products obtained by multiplication of an output signal of the external modulator and the clock signal; and control means for detecting an optimal bias point of the external modulator on the basis of the mean output value of the products obtained by the multiplication, which is output from the mean output measuring means, and maintaining an optimal bias voltage corresponding to the optimal bias point.

Preferably, in the bias voltage stabilizing apparatus, the control means may set a bias point, obtained when the mean output value from the mean output measuring means is "0", to the optimal bias point.

Preferably, in the bias voltage stabilizing apparatus, the control means may be operated so that, if the external modulator is a pulse generating modulator for Return-to-Zero (RZ) modulation using Non-Return-to-Zero (NRZ) data, the control means increases the bias voltage applied to the external modulator by $\Delta V$ when the mean output value from the mean output measuring means is a positive (+) value, while the control means decreases the bias voltage by $\Delta V$ when the mean output value is a negative (−) value, thus maintaining the optimal bias voltage.

Preferably, in the bias voltage stabilizing apparatus, the control means may be operated so that, if the external modulator is a carrier suppressed pulse generating modulator for Carrier Suppressed Return-to-Zero (CSRZ) modulation, the control means decreases the bias voltage applied to the external modulator by $\Delta V$ when the mean output value from the mean output measuring means is a positive (+) value, while the control means increases the bias voltage by $\Delta V$ when the mean output value from the mean output measuring means is a negative (−) value, thus maintaining the optimal bias voltage.

Further, the present invention provides a method of stabilizing a bias voltage for an external modulator used for pulse generation, the modulator modulating a series of light beams into a pulse-type optical signal, comprising the steps of a) detecting an output signal of the external modulator, to which the bias voltage to be stabilized is applied; b) detecting a drive clock signal applied to the external modulator; c) outputting a mean output value of products obtained by multiplication of the output signal and the clock signal; and d) adjusting the bias voltage so that the mean output value becomes "0"; wherein the steps a) to d) are repeatedly performed.

Preferably, in the bias voltage stabilizing method, the step d) may comprise the steps of d1) initializing an optimal bias ascertaining variable "start" to "0"; d2) determining whether the mean output value of the products obtained by the multiplication of the output signal and the clock signal is "0"; d3) determining whether the optimal bias ascertaining variable "start" is "0"; d4) increasing or decreasing the bias voltage by $\Delta V$ and then returning to step d2) if the mean output value is "0" and the optimal bias ascertaining variable "start" is "0"; d5) changing the optimal bias ascertaining variable "start" to "1" if the mean output value is not "0" and the optimal bias ascertaining variable "start" is "0"; d6) increasing or decreasing the bias voltage by $\Delta V$ according to whether the mean output value is a negative or positive value, and returning to step d2), if the mean output value is not "0" and the optimal bias ascertaining variable "start" is not "0", or after step d5) has been performed; and d7) maintaining a current bias voltage if the mean output value is "0" and the optimal bias ascertaining variable "start" is not "0".

Preferably, in the bias voltage stabilizing method, the step d) may be performed so that, if the external modulator is a pulse generating modulator for RZ modulation using NRZ data, the bias voltage is increased by $\Delta V$ when the mean output value is a positive (+) value, while the bias voltage is decreased by $\Delta V$ when the mean output value is a negative (−) value, thus maintaining the optimal bias voltage.

Preferably, in the bias voltage stabilizing method, the step d) may be performed so that, if the external modulator is a carrier suppressed pulse generating modulator for CSRZ modulation, the bias voltage is decreased by $\Delta V$ when the mean output value is a positive (+) value, while the bias voltage is increased by $\Delta V$ when the mean output value is a negative (−) value, thus maintaining the optimal bias voltage.

In addition, the present invention provides a computer-readable recording medium for storing a program implemented to perform the respective steps included in the bias voltage stabilizing method.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, an apparatus and method for stabilizing a bias voltage for a pulse generating modulator according to embodiments of the present invention will be described in detail with reference to the attached drawings.

Reference now should be made to the drawings, in which the same reference numerals are used throughout the different drawings to designate the same or similar components.

Figure 4:
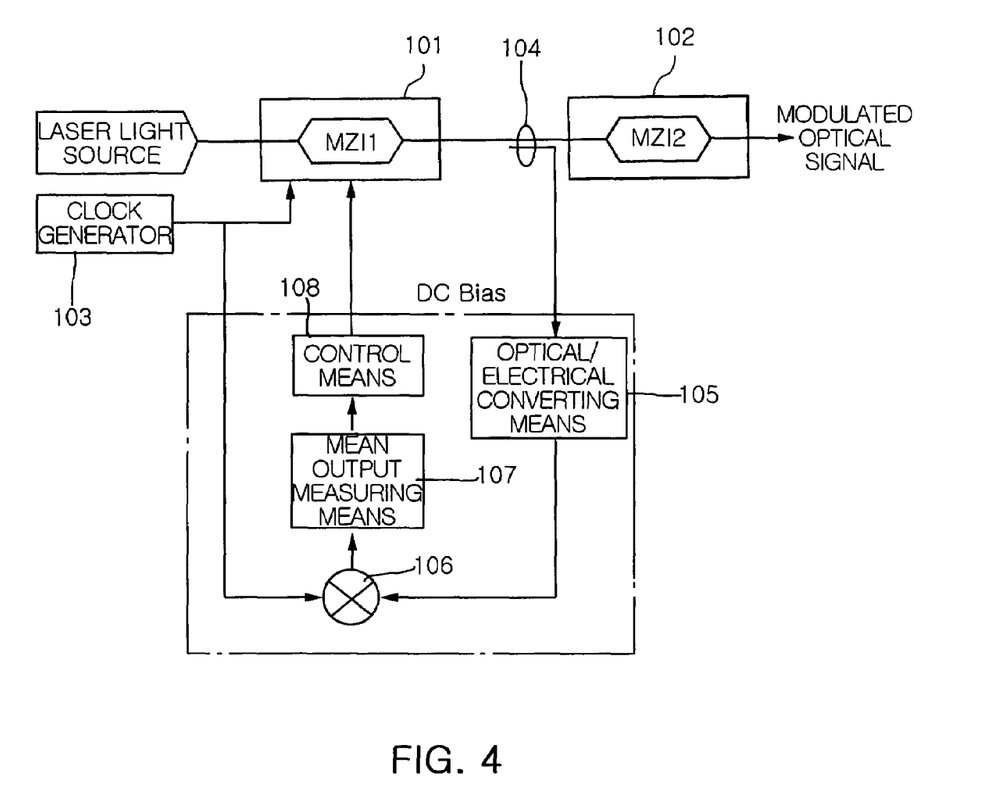
FIG. 4 is a block diagram of an apparatus for stabilizing a bias voltage for a pulse generating modulator according to an embodiment of the present invention.

FIG. 4 is a view showing the entire construction of an apparatus for stabilizing a bias voltage according to the present invention. The apparatus of the present invention includes an optical dividing means 104 for allowing an output optical signal of a first external modulator 101 to branch off, an optical/electrical converting means 105 for converting the output optical signal branched by the optical dividing means 104 into an electrical signal, a multiplying means 106 for multiplying the signal, output from the first external modulator 101 and applied through the optical/electrical signal converting means 105, by a drive clock signal applied to the first external modulator 101 from a clock generator 103, a mean output measuring means 107 for measuring a mean output value of the products output from the multiplying means 106, and a control means 108 for detecting an optimal bias point of the first external modulator 101 on the basis of the mean output value output from the mean output measuring means 107, correcting the variation of a bias voltage, and then maintaining the corresponding optimal bias point.

In the above construction, a series of laser beams emitted from a laser light source is input to the first external modulator 101 used for pulse generation and converted into a pulse signal as indicated by reference numeral 302 of FIG. 3. The pulse signal is input to a second external modulator 102 performing ON/OFF operations using data, so that the data is carried on the pulse signal.

In the operation of the modulator, the bias stabilizing apparatus of the present invention stabilizes an optimal bias voltage so as to prevent the optimal bias voltage from varying due to a temperature variation while applying the optimal bias voltage to the first external modulator 101. This stabilizing operation is described below.

The optical dividing means 104 allows the output optical signal of the first external modulator 101 to be stabilized, to branch off. The output optical signal branched by the optical dividing means 104 is converted into the electrical signal by the optical/electrical converting means 105. The electrical signal output from the optical/electrical converting means 105 has pulse characteristics equal to those of the optical signal output from the first external modulator 101, and corresponds to the pulse signal output from the first external modulator 101.

The electrical signal output from the optical/electrical converting means 105 in this way is multiplied by the drive clock signal applied to the first external modulator 101 by the multiplying means 106. In this case, the clock generator 103 is a means that provides a reference clock signal for driving to the first external modulator 101 and belongs to a conventional modulating apparatus without being newly added according to the present invention.

The mean output measuring means 107 measures a mean output value of the products obtained by the multiplication of the output pulse signal of the first external modulator 101 and the clock signal that are output from the multiplying means 106.

The control means 108 predicts a direction, in which the bias voltage varies from the optimal bias voltage, on the basis of the mean output value of the products obtained by the multiplication of the output pulse signal of the first external modulator 101 and the clock signal, as described above, and corrects the bias voltage, thus realizing the stabilization of the bias voltage. The principles of the stabilization of the bias voltage performed through the control means 108 according to the present invention are described below.

Figure 5A:
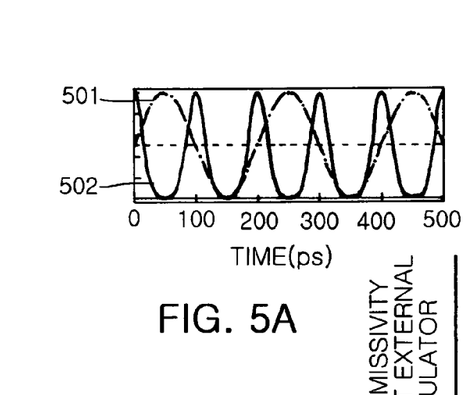
FIGS. 5a to 5c are graphs showing the variations of an output signal and a clock signal according to the variations of the bias voltage for the pulse generating modulator used in RZ modulation using NRZ data.
Figure 5B:
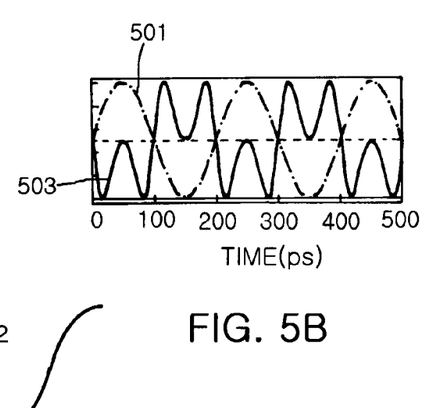
Figure 5C:
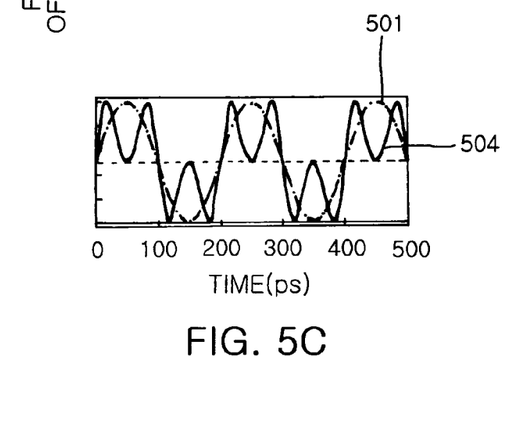

FIGS. 5a to 5c are graphs showing the variations of an output signal according to the variations of a DC bias voltage in an external pulse generating modulator of a RZ modulator using NRZ data in which an optimal bias voltage is located at the peak point. Point P1 represents a position at which the optimal bias voltage for the first external modulator 101 is located, point P2 indicates that the bias voltage varies from the optimal bias voltage in a positive direction, and point P3 indicates that the bias voltage varies from the optimal bias voltage in a negative direction.

A graph of FIG. 5a shows a drive clock signal 501 applied to the first external modulator 101, and a signal output from the first external modulator 101, that is, an output signal 502 from the optical/electrical converting means 105 of FIG. 4, at the optimal point P1 of the bias voltage. At this time, the clock signal 501 has a positive (+) value on an upper portion thereof on the basis of a dotted line and a negative (−) value on a lower portion thereof. Therefore, if the clock signal 501 and the output signal 502 shown in the graph of FIG. 5a are multiplied together by the multiplying means 106, and thereafter the mean output value of the products obtained by the multiplication is measured, "0" is obtained as the mean output value because symmetry between the clock signal 501 and the output signal 502 exists.

Further, if the bias voltage increases up to the point P2, the output signal of the first external modulator 101 is shown as represented by reference numeral 503 in a graph of FIG. 5b. Therefore, symmetry between the clock signal 501 and the output signal 503 is upset, so that a negative value is obtained as the mean output value of the products obtained by multiplication when the two signals 501 and 503 are multiplied together.

On the contrary, if the bias voltage decreases up to the point P3, the output signal of the first external modulator 101 is shown as represented by reference numeral 504 in a graph of FIG. 5c. Therefore, a positive value is obtained as the mean output value of the products obtained by the multiplication when the two signals 501 and 504 are multiplied together.

Figure 6:
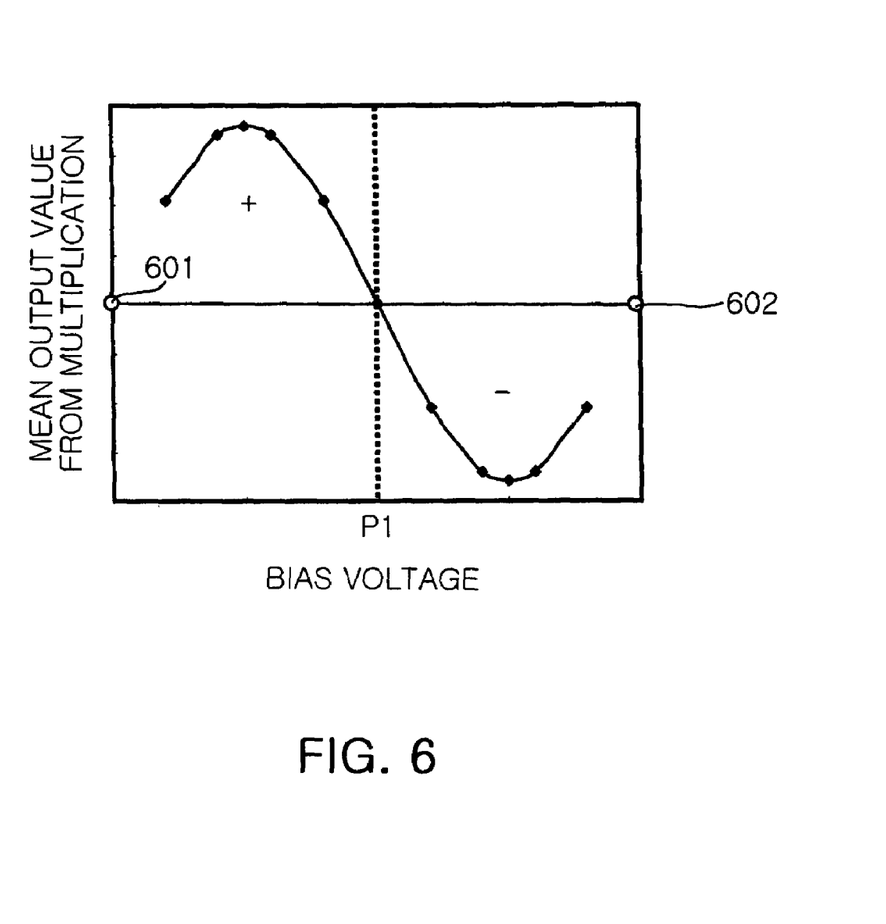
FIG. 6 is a graph showing a relationship between the bias voltage for the pulse generating modulator and a mean output value of the products obtained by multiplication of the output signal and the clock signal, in the RZ modulation using NRZ data.

FIG. 6 is a graph showing the mean output value of the products obtained by the multiplication of the output signal of the first external modulator and the clock signal, in which the mean output value is measured while the DC bias voltage is sequentially changed from a minimum value to a maximum value with respect to the pulse generating modulator of the RZ modulator using NRZ data. As shown in FIG. 6, it can be seen that "0" is obtained as the mean output value at the optimal bias voltage P1, a negative (−) value is obtained as the mean output value if the bias voltage varies in a direction in which the bias voltage increases from the optimal bias voltage P1, and a positive (+) value is obtained as the mean output value if the bias voltage varies in a direction in which the bias voltage decreases from the optimal bias voltage P1.

Figures 7A, 7B:
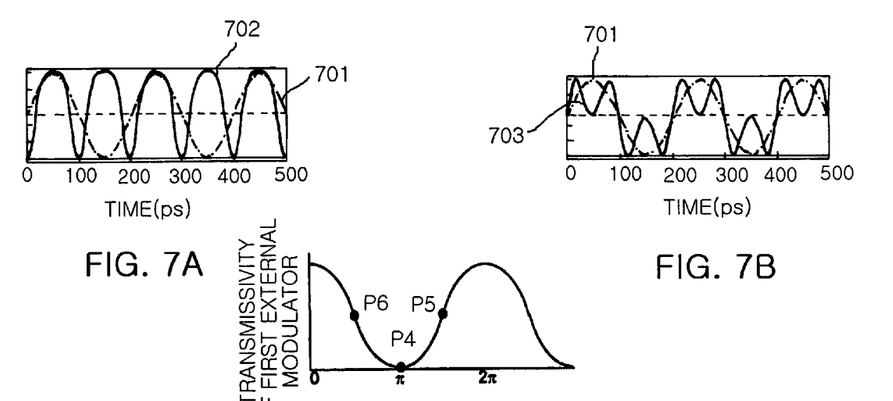
FIGS. 7a to 7c are graphs showing the variations of an output signal and a clock signal according to the variations of a bias voltage for a pulse generating modulator used in CSRZ modulation.
Figure 7C:
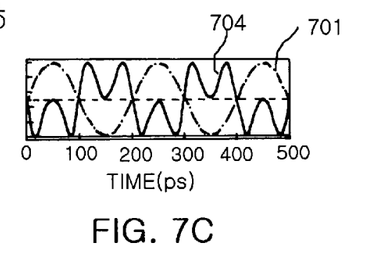

Next, FIGS. 7a to 7c are graphs showing clock signals and output signals of a corresponding modulator, measured when a bias voltage is optimal (P4), increases (P5) and decreases (P6), respectively, in a pulse generating modulator of a CSRZ modulator in which an optimal bias voltage is located at the bottom point.

In this case, when the bias voltage is optimal (P4), the output signal of a corresponding carrier suppressed pulse generating modulator is shown as represented by a graph 702 of FIG. 7a, and the drive clock signal applied to the corresponding modulator is shown as represented by a graph 701. In this case, the clock signal 701 has a positive (+) value on an upper portion thereof on the basis of a dotted line, and a negative (−) value on a lower portion thereof. If the two signals 701 and 702 are multiplied together and the mean output value of the products obtained by the multiplication of the signals 701 and 702 is measured, "0" is obtained as the mean output value.

Further, if the bias voltage varies in the increasing direction P5, the output signal of the carrier suppressed pulse generating modulator is shown as represented by a graph 703 of FIG. 7b. The output signal 703 exhibits signal distortion, and then a positive (+) value is obtained as the mean output value of the products obtained by multiplication when the two signals 701 and 703 are multiplied together.

On the contrary, if the bias voltage varies in the decreasing direction (P6), the output signal is shown as represented by a graph 704 of FIG. 7c, which has a phase difference of 180 degrees with respect to the clock signal 701 and exhibits signal distortion. Therefore, if a mean output value of the products obtained by the multiplication of the clock signal 701 and the output signal 704 is measured, the mean output value has a negative (−) value.

Figure 8:
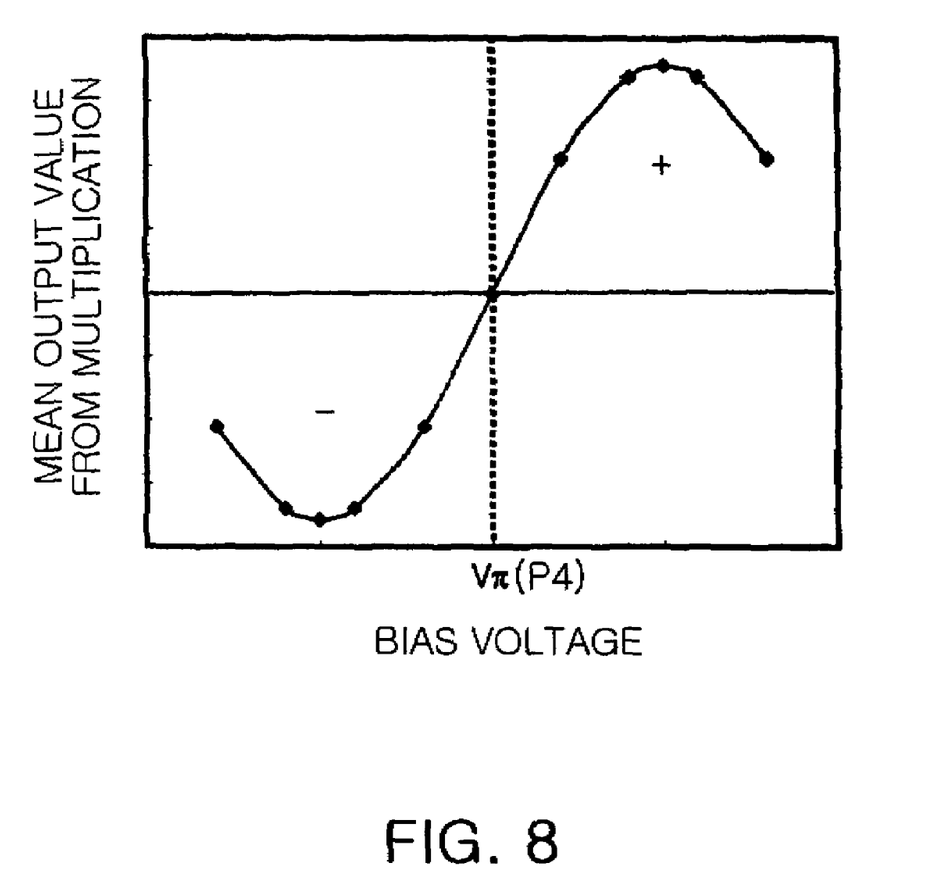
FIG. 8 is a graph showing a relationship between the bias voltage for the pulse generating modulator and a mean output value of the products obtained by the multiplication of the output signal and the clock signal in the CSRZ modulation.

FIG. 8 is a graph showing the mean output value of the products obtained by the multiplication of the output signal and the clock signal, in which the mean output value is measured while the DC bias voltage is sequentially changed from a minimum value to a maximum value with respect to the carrier suppressed pulse generating modulator. As shown in FIG. 8, it can be seen that the mean output value is "0" at the optimal bias voltage P4, the mean output value is a positive (+) value if the bias voltage varies in a direction in which the bias voltage increases from the optimal bias voltage P4, and the mean output value is a negative (−) value if the bias voltage varies in a direction in which the bias voltage decreases from the optimal bias voltage P4.

If the graphs of FIGS. 6 and 8 are compared to each other, the mean output values of the products obtained by the multiplications are equally "0" when the optimal bias voltage is applied. In contrast, the mean output values thereof have opposite sign values when the bias voltage increases and decreases.

The bias voltage stabilizing method of the present invention corrects the bias voltage by determining the varying direction of the bias voltage on the basis of the mean output value of the products obtained by the multiplication of the output signal and the clock signal, as described above.

Therefore, the control means 108 examines the mean output value output from the mean output measuring means 107 while varying the bias voltage from a minimum value to a maximum value at the time of initial driving, sets a bias voltage, obtained when the mean output value is "0", to the optimal bias voltage, and applies the optimal bias voltage to the modulator. Thereafter, the control means 108 examines the variations of the mean output value output from the mean output measuring means 107 during the operation of the modulator, and increases or decreases the bias voltage according to whether the mean output value is a positive (+) or negative (−) value. At this time, depending on the types of modulators, the increasing/decreasing direction of the bias voltage varies. For example, with respect to a pulse generating modulator used in RZ modulation using NRZ data, the control means 108 increases the bias voltage by a unit value ΔV if the mean output value is a positive value, while it decreases the bias voltage by the unit value ΔV if the mean output value is a negative value. On the contrary, with respect to a carrier suppressed pulse generating modulator used in CSRZ modulation, the control means 108 decreases the bias voltage by the unit value ΔV if the mean output value is a positive value, while it increases the bias voltage by the unit value ΔV if the mean output value is a negative value.

Consequently, through the correction, the bias voltage is adjusted so that the mean output value of the products obtained by the multiplication of the output signal and the clock signal is maintained at "0".

Figure 9:
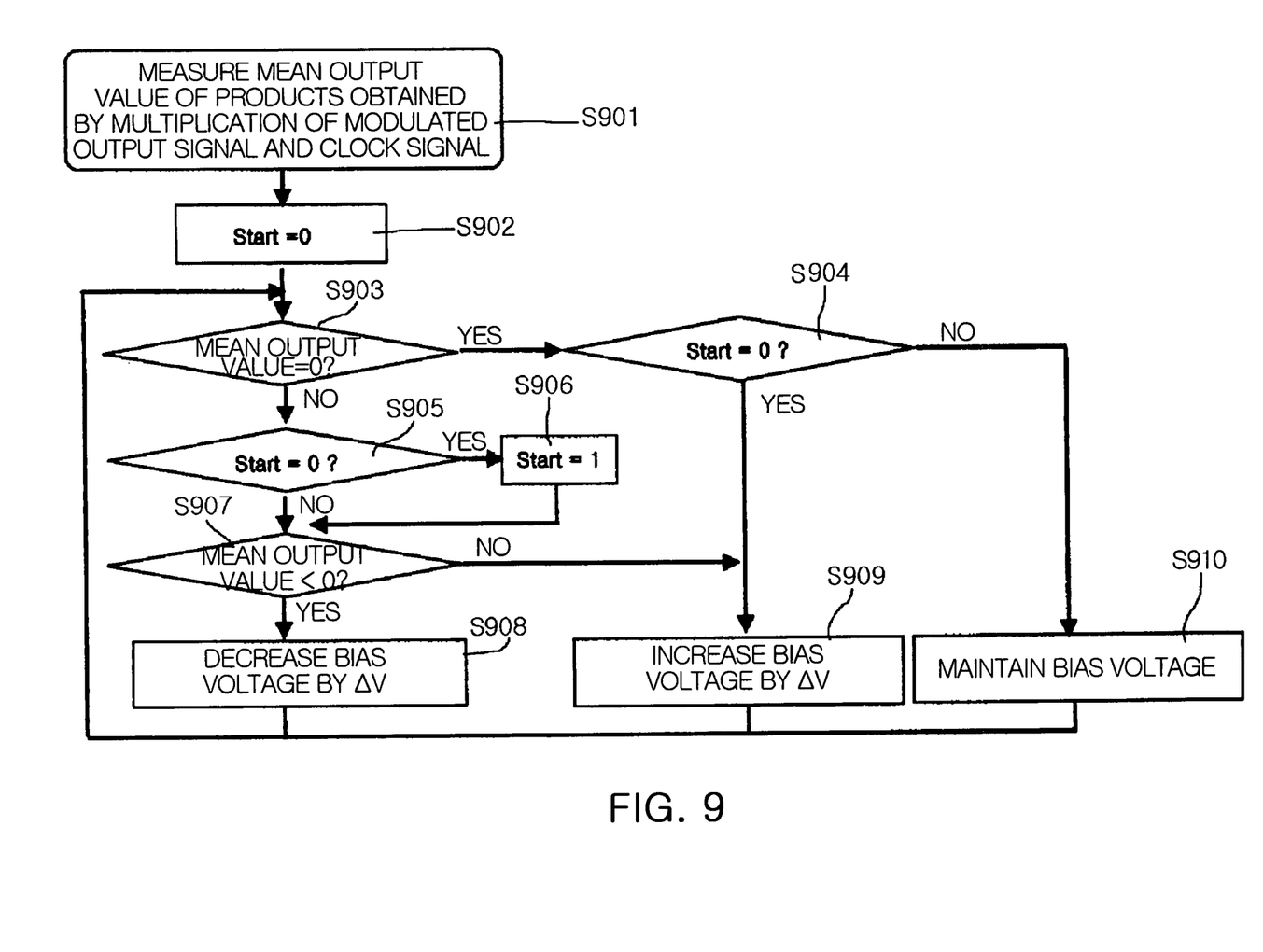
FIG. 9 is a flowchart of a method of stabilizing a bias voltage for a pulse generating modulator according an embodiment of the present invention.

FIG. 9 is a flowchart of a method of stabilizing a bias voltage according to an embodiment of the present invention, which shows a bias voltage stabilizing process for a pulse generating modulator used in the RZ modulation using NRZ data.

A bias voltage stabilizing method for the carrier suppressed pulse generating modulator used in the CSRZ modulation is almost equal to that of FIG. 9. However, there is a difference between the two methods in directions in which bias voltages are corrected depending on the positive/negative of the mean output value of the products obtained by the multiplication. Therefore, in order to avoid later repetitive descriptions, a description is mainly carried out with respect to the stabilization of the bias voltage for the pulse generating modulator used in the RZ modulation.

For the purpose of stabilizing the bias voltage, an output signal of a corresponding modulator to be stabilized and a drive clock signal are multiplied together, and the mean output value of the products obtained by the multiplication is measured at step S901. This step can be performed in such a way that, as shown in FIG. 4, an optical signal output from the external modulator 101 to be stabilized branches off by the optical dividing means 104, the branched output signal is converted into an electrical signal by the optical/electrical converting means 105, the electrical signal output from the optical/electrical converting means 105 is multiplied by the clock signal applied to the external modulator 101 by the multiplying means 106, and the mean output value of the products obtained by the multiplication is measured by the mean output measuring means 108.

If the measured mean output value of the products obtained by the multiplication is "0", the bias voltage is located at an optimal point, as described with reference to FIGS. 6 and 8, so that the optimal bias voltage needs only to be maintained. However, in this case, the "0" value may be obtained at a zero point (601 or 602 of FIG. 6) to which the bias voltage varies from an actual optimal point by Vπ. Therefore, when the optimal point of the bias voltage is detected at the time of initial driving, it is necessary to ascertain the optimal point one more time while increasing or decreasing the bias voltage even though the measured mean output value is "0".

Therefore, if an optimal point ascertaining variable "start" is set, "start=0" indicates that a procedure of examining an optimal point of the bias voltage is not executed yet. Therefore, even though the mean output value is "0", the "0" value may be obtained at the point 601 or 602 to which the bias voltage varies by Vπ, so that the bias voltage is not immediately fixed, but an optimal point detecting procedure is executed after increasing the bias voltage by ΔV. If the optimal point detecting procedure starts once, the variable "start" is changed to "1", and thereafter an operation of maintaining the optimal bias voltage is performed.

The above process is described in detail. First, at the time of initial driving, the optimal point ascertaining variable "start" is set to "0" at step S902.

Thereafter, it is determined whether the mean output value measured at step S901, that is, the mean output value of the products obtained by the multiplication of the modulated output signal and the clock signal, is "0" at step S903.

If the mean output value is "0" at step S903, it is determined whether the variable "start" is "0" so as to ascertain whether a current bias voltage is at an optimal point and whether the "0" value is obtained at points to which the bias voltage varies by Vπ from the optimal point at step S904. In this case, the variable "start" of "0" means that it is required to ascertain the optimal point. Therefore, after the bias voltage is increased (or decreased) by ΔV at step S909, the mean output value is corrected to be "0" through a procedure of correcting the bias voltage at steps S903 to S909.

At a second determination performed at step S903, if the mean output value of the products obtained by the multiplication is still "0", the ascertainment of the optimal point of the bias voltage is still required, so that an operation of increasing (or decreasing) the bias voltage is repeatedly performed to detect the optimal point.

Further, if the mean output value is not "0", it is first determined whether the variable "start" is "0" before the bias voltage correcting procedure is executed at step S905. If the variable "start" is "0" at step S905, it is changed to "1" because the bias voltage correcting procedure starts at step S906.

Thereafter, it is determined whether the mean output value of the products obtained by the multiplication is a positive (+) or negative (−) value at step S907. On the basis of the principles shown in FIG. 6, if the mean output value is a negative value, the bias voltage is decreased by ΔV at step S908, while if the mean output value is a positive value, the bias voltage is increased by ΔV at step S909.

Thereafter, if the bias voltage has reached the optimal point while repeatedly performing steps S903 to S909, the mean output value of the products obtained by the multiplication becomes "0" at step S903. Further, if the variable "start" becomes "1", the corresponding bias voltage is maintained at step S910.

The above-described process is repeatedly executed during the operation of the modulator, so that the operating characteristics of the modulator can be stabilized even though the bias voltage varies due to the variation of a temperature.

The bias voltage stabilizing method described above can be implemented in the form of a computer-readable program recorded on a computer-readable recording medium. In this case, the computer-readable recording medium includes all the types of data recording means readable by a computer system, such as a Read Only Memory (ROM), a Random Access Memory (RAM), a Compact Disk-ROM (CD-ROM), a magnetic tape, a floppy disk, and an optical data storage.

As described above, the present invention provides an apparatus and method of stabilizing a bias voltage, which has excellent advantages in that it can automatically and easily detect an optimal point of a bias voltage for a pulse generating modulator used in Return-to-Zero (RZ) modulation using Non-Return-to-Zero (NRZ) data or Carrier Suppressed Return-to-Zero (CSRZ) modulation, without using an additional light source or requiring a complicated design, and which can stabilize the bias voltage by immediately correcting the variation of the bias voltage due to the variation of a temperature.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for stabilizing a bias voltage for an external modulator used for pulse generation, comprising:
    optical dividing means for allowing an optical signal output from the external modulator, to which the bias voltage is to be applied, to branch off;
    optical/electrical converting means for converting the output optical signal branched by the optical dividing means into an electrical signal;
    multiplying means for multiplying the optical signal, output from the external modulator and applied through the optical/electrical converting means, by a drive clock signal applied to the external modulator;
    mean output measuring means for measuring a mean output value of products obtained by multiplication of an output signal of the external modulator and the clock signal; and
    control means for initializing an optimal bias ascertaining variable to be "0", increasing a bias voltage by a unit value when the optimal bias ascertaining variable is "0" and the mean output value is "0", changing the optimal bias ascertaining variable to be "1" when the optimal bias ascertaining variable is "0", and the mean output value is not "0", increasing or decreasing the bias voltage by the unit value depending on whether the mean output value is negative or positive when the optimal bias ascertaining variable is "1" and the mean output value is not "0", and maintaining a present bias voltage as it is when the optimal bias ascertaining variable is "1" and the mean output value is "0".

2. The bias voltage stabilizing apparatus according to claim 1, wherein the control means is operated so that, if the external modulator is a pulse generating modulator for Return-to-Zero (RZ) modulation using Non-Return-to-Zero (NRZ) data, the control means increases the bias voltage applied to the external modulator by a unit value when the mean output value from the mean output measuring means is a positive (+) value, while the control means decreases the bias voltage by the unit value when the mean output value is a negative (−) value, thus maintaining the optimal bias voltage.

3. The bias voltage stabilizing apparatus according to claim 1, wherein the control means is operated so that, if the external modulator is a carrier suppressed pulse generating modulator for Carrier Suppressed Return-to-Zero (CSRZ) modulation, the control means decreases the bias voltage applied to the external modulator by a unit value when the mean output value from the mean output measuring means is a positive (+) value, while the control means increases the bias voltage by the unit value when the mean output value from the mean output measuring means is a negative (−) value, thus maintaining the optimal bias voltage.

4. A method of stabilizing a bias voltage for an external modulator used for pulse generation, the modulator modulating a light beam into a pulse-type optical signal, comprising the steps of:
    a) detecting an output signal of the external modulator, to which the bias voltage to be stabilized is applied;
    b) detecting a drive clock signal applied to the external modulator;
    c) outputting a mean output value of products obtained by multiplication of the output signal and the clock signal; and
    d) adjusting the bias voltage so that the mean output value becomes "0"; wherein the steps a) to d) are repeatedly performed, wherein the step d) comprises the steps of:
    d1) initializing an optimal bias ascertaining variable "start" to "0";
    d2) determining whether the mean output value of the products obtained by the multiplication of the output signal and the clock signal is "0";
    d3) determining whether the optimal bias ascertaining variable "start" is "0";
    d4) increasing or decreasing the bias voltage by a unit value and then returning to step d2) if the mean output value is "0" and the optimal bias ascertaining variable "start" is "0";

d5) changing the optimal bias ascertaining variable "start" to "1" if the mean output value is not "0" and the optimal bias ascertaining variable "start" is "0";

d6) increasing or decreasing the bias voltage by the unit value according to whether the mean output value is a negative or positive value, and returning to step d2), if the mean output value is not "0" and the optimal bias ascertaining variable "start" is not "0", or after step d5) has been performed; and d7) maintaining a current bias voltage if the mean output value is "0" and the optimal bias ascertaining variable "start" is not "0".

5. The bias voltage stabilizing method according to claim 4, wherein the step d) is performed so that, if the external modulator is a pulse generating modulator for RZ modulation using NRZ data, the bias voltage is increased by the unit value when the mean output value is a positive (+) value, while the bias voltage is decreased by the unit value when the mean output value is a negative (−) value, thus maintaining the optimal bias voltage.

6. The bias voltage stabilizing method according to claim 4, wherein the step d) is performed so that, if the external modulator is a carrier suppressed pulse generating modulator for CSRZ modulation, the bias voltage is decreased by the unit value when the mean output value is a positive (+) value, while the bias voltage is increased by the unit value when the mean output value is a negative (−) value, thus maintaining the optimal bias voltage.

7. A computer-readable medium encoded with instructions which when executed by a processor perform the following steps:

a) detecting an output signal of the external modulator, to which the bias voltage to be stabilized is applied;

b) detecting a drive clock signal applied to the external modulator;

c) outputting a mean output value of products obtained by multiplication of the output signal and the clock signal; and d) adjusting the bias voltage so that the mean output value becomes "0"; wherein the steps a) to d) are repeatedly performed, wherein the step d) comprises the steps of:

d1) initializing an optimal bias ascertaining variable "start" to "0";

d2) determining whether the mean output value of the products obtained by the multiplication of the output signal and the clock signal is "0";

d3) determining whether the optimal bias ascertaining variable "start" is "0";

d4) increasing or decreasing the bias voltage by $\Delta V$ and then returning to step d2) if the mean output value is "0" and the optimal bias ascertaining variable "start" is "0";

d5) changing the optimal bias ascertaining variable "start" to "1" if the mean output value is not "0" and the optimal bias ascertaining variable "start" is "0";

d6) increasing or decreasing the bias voltage by $\Delta V$ according to whether the mean output value is a negative or positive value, and returning to step d2), if the mean output value is not "0" and the optimal bias ascertaining variable "start" is not "0", or after step d5) has been performed; and d7) maintaining a current bias voltage if the mean output value is "0" and the optimal bias ascertaining variable "start" is not "0".

\* \* \* \* \*